US010891870B2

(12) United States Patent
Gros et al.

(10) Patent No.: US 10,891,870 B2
(45) Date of Patent: Jan. 12, 2021

(54) SYSTEM AND METHOD FOR AIDING THE NAVIGATION OF AN AIRCRAFT WITHIN AN AIRPORT

(71) Applicant: AIRBUS (S.A.S.), Blagnac (FR)

(72) Inventors: Nicolas Gros, Saint-Lys (FR); Antoine Casta, Saint-Jean (FR)

(73) Assignee: AIRBUS (S.A.S.), Blagnac (FR)

( * ) Notice: Subject to any disclaimer, the term of this patent is extended or adjusted under 35 U.S.C. 154(b) by 193 days.

(21) Appl. No.: 16/126,383

(22) Filed: Sep. 10, 2018

(65) Prior Publication Data

US 2019/0080622 A1 Mar. 14, 2019

(30) Foreign Application Priority Data

Sep. 13, 2017 (FR) ...................................... 17 58473

(51) Int. Cl.
| G08G 5/06 | (2006.01) |
| G08G 5/00 | (2006.01) |
| G01C 21/36 | (2006.01) |
| G01C 21/34 | (2006.01) |
| G08G 5/04 | (2006.01) |
| G01C 23/00 | (2006.01) |

(52) U.S. Cl.
CPC ......... G08G 5/065 (2013.01); G01C 21/3492 (2013.01); G01C 21/3667 (2013.01); G01C 23/005 (2013.01); G08G 5/0008 (2013.01); G08G 5/0013 (2013.01); G08G 5/0021 (2013.01); G08G 5/0078 (2013.01); G08G 5/0082 (2013.01); G08G 5/045 (2013.01)

(58) Field of Classification Search
CPC ............ G01C 21/3492; G01C 21/3667; G01C 23/005; G08G 5/0008; G08G 5/0013; G08G 5/0021; G08G 5/0078; G08G 5/0082; G08G 5/065
See application file for complete search history.

(56) References Cited

U.S. PATENT DOCUMENTS

| 3,706,969 A | * | 12/1972 | Paredes | ................ G08G 5/0013 340/989 |
| 5,268,698 A | * | 12/1993 | Smith, Sr. | ................ G01S 5/04 340/552 |
| 7,796,055 B2 | | 9/2010 | Clark et al. | |

(Continued)

FOREIGN PATENT DOCUMENTS

FR        2 901 903        12/2007

OTHER PUBLICATIONS

Search Report and Written Opinion for FR1758473, dated Jul. 2, 2018, 9 pages, (non-English).

Primary Examiner — Tyler J Lee
(74) Attorney, Agent, or Firm — Nixon & Vanderhye P.C.

(57) ABSTRACT

A system (1) for aiding navigation includes an airport navigation device (2) to generate a ground route within the airport for an aided aircraft, a device (3) for determining the current position of the aided aircraft, a traffic surveillance device (9) for determining the location and type of nearby aircraft, a computation unit (10) for determining, for each segment of the ground route congestion information as a function of the position, type and speed of the nearby aircraft on each of the segments, and a display device displaying an airport map, the current location of the aided aircraft and congestion information for each segment.

12 Claims, 6 Drawing Sheets

(56) References Cited

U.S. PATENT DOCUMENTS

| | | | | |
|---|---|---|---|---|
| 7,860,641 | B2* | 12/2010 | Meunier | G01C 23/00 |
| | | | | 701/120 |
| 8,296,060 | B2 | 10/2012 | Fetzmann et al. | |
| 9,396,663 | B2* | 7/2016 | Zimmer | G08G 5/065 |
| 9,734,729 | B2* | 8/2017 | Beda | G08G 5/065 |
| 2005/0190079 | A1* | 9/2005 | He | G08G 5/0021 |
| | | | | 340/945 |
| 2006/0142904 | A1* | 6/2006 | Caillaud | G08G 5/0021 |
| | | | | 701/3 |
| 2010/0042312 | A1* | 2/2010 | Meunier | G01C 23/00 |
| | | | | 701/120 |
| 2011/0125400 | A1* | 5/2011 | Michel | G08G 5/065 |
| | | | | 701/532 |
| 2014/0278062 | A1* | 9/2014 | Han | G08G 3/02 |
| | | | | 701/423 |
| 2014/0336921 | A1* | 11/2014 | Schulte | G01C 23/005 |
| | | | | 701/409 |
| 2015/0298817 | A1 | 10/2015 | Jackson et al. | |
| 2016/0052641 | A1 | 2/2016 | Olofinboba et al. | |
| 2017/0032687 | A1 | 2/2017 | Lamkin et al. | |
| 2018/0233052 | A1* | 8/2018 | Shamasundar | G08G 5/025 |
| 2018/0281948 | A1* | 10/2018 | Tao | G08G 5/0013 |

* cited by examiner

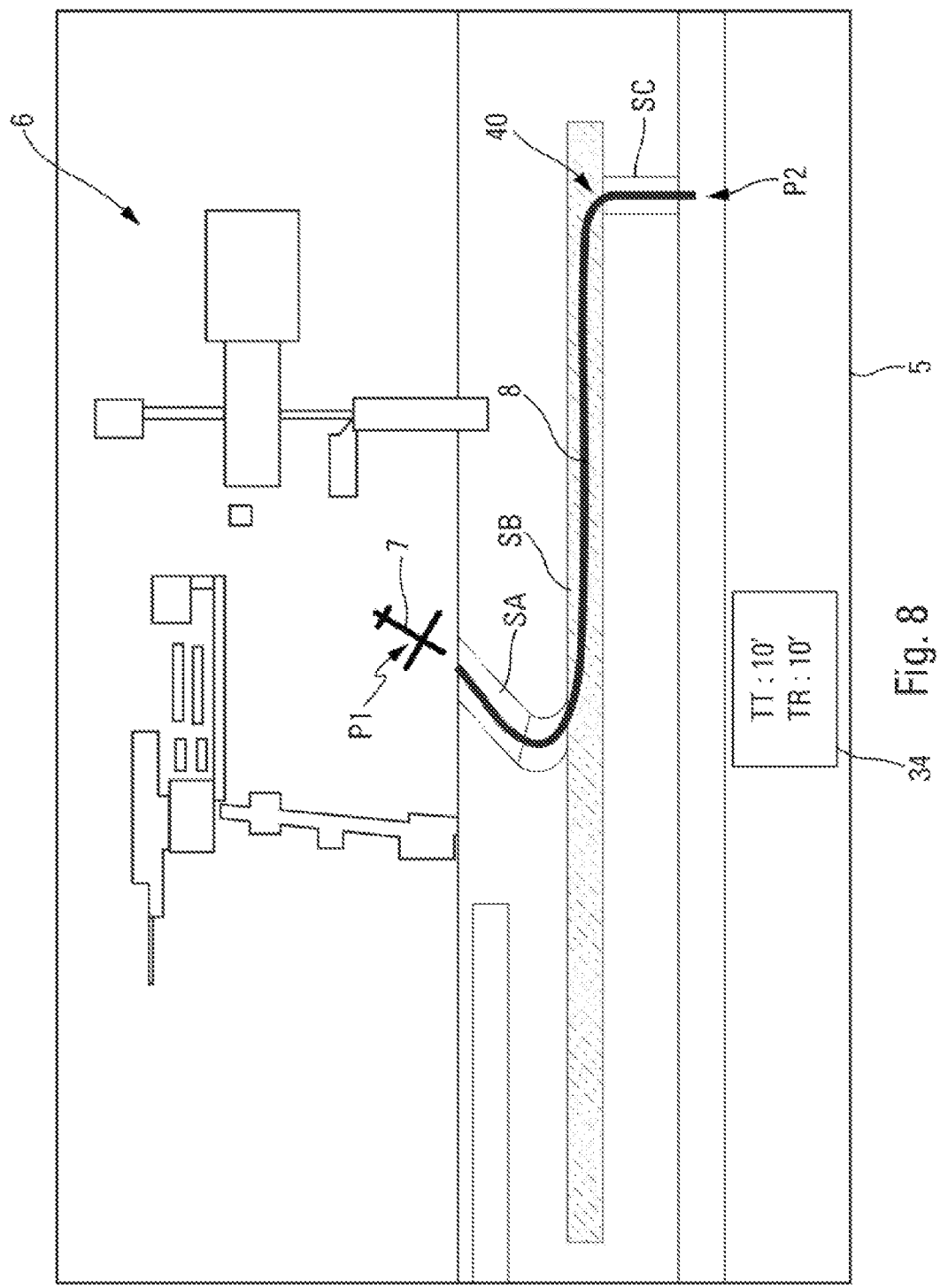

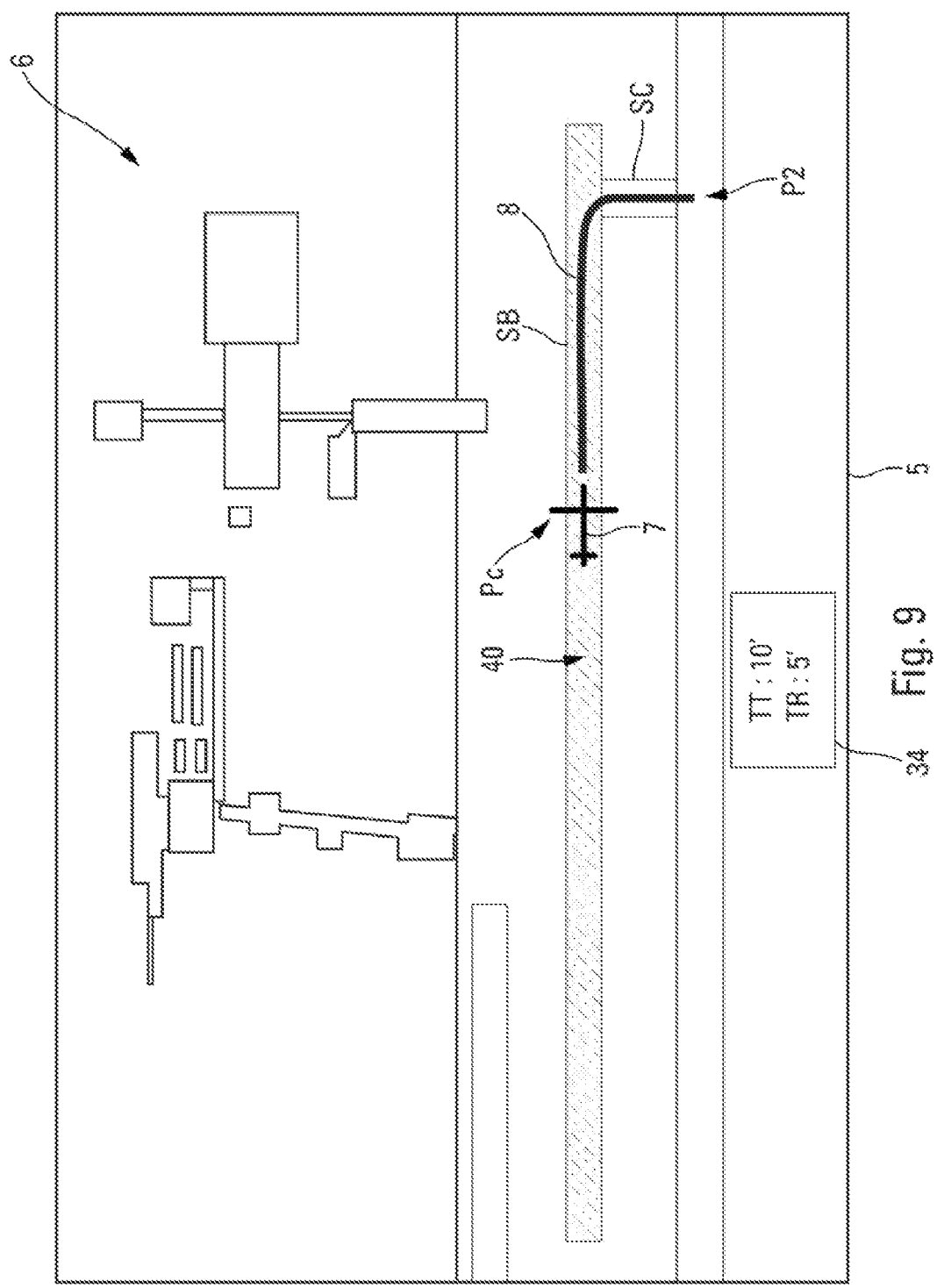

SYSTEM AND METHOD FOR AIDING THE NAVIGATION OF AN AIRCRAFT WITHIN AN AIRPORT

RELATED APPLICATION

This application claims priority to French Patent Application 17 58473 filed Sep. 13, 2017, the entirety of which is incorporated by reference.

TECHNICAL FIELD

The present invention relates to a method and a system for aiding the navigation of an aircraft within an airport.

BACKGROUND

The complexity of certain airports, the increase in air traffic and the existence of installations in an airport that are unsuited for large aircraft or many aircraft, create difficulties for the movement and flow of aircraft on the runways and taxiways of an airport. These difficulties result in aircraft having prolonged periods of taxiing about the airport.

Applicant patented, in U.S. Pat. No. 8,296,060 and French Patent 2 901 903, a method which displays on a viewing screen in an aircraft cockpit an airport map which at least partially represents the airport. On the airport map is displayed an aircraft symbol which illustrates the current position of the aircraft. According to the method, the following operations are performed:

(i) data produced by the air traffic controller for the airport and which relates to the route to be followed by the aircraft within the airport are received by the aircraft via a data transmission link; and (ii) these received data are presented automatically in graphical form on the display in the cockpit to show a plot of a route in the airport prescribed by the air traffic controller to be followed by the aircraft.

The pilot maneuvers the aircraft to follow to the displayed route to reach the destination in the airport at the end of the route. The displayed route eases the workload of the pilot by reducing the tasks needed to determine the route prescribed by the air traffic controller.

Although the displayed route through the airport is useful and provides valuable items of information for aiding ground navigation of the aircraft within the airport, the route does not give the pilot and other members of the aircrew a reliable indication of the journey time along the route. This journey time depends on the length of the route and the traffic within the airport.

Moreover, a fuel savings technique used during taxiing in an airport is to run only one of the aircraft's engines. Running on a single engine for extended periods may damage that engine. Thus, the technique of moving an aircraft with a single engine at an airport is best performed knowing the time needed for taxiing. The time needed for taking also allows the fuel savings to be calculated for running a single engine as compared to running two or more engines to taxi the aircraft. Further, it is necessary that the engine warm-up times be complied with accurately to provide a sufficient warm up period to ensure the engines are not damaged when operated at full power during takeoff.

Airport navigation devices currently give a fragmented picture of the situation of the aircraft within the airport. Hence, to optimize the use of the engines during a taxiing procedure with a single engine turning, the crew takes conservative measures for the restart times, since they do not have accurate knowledge of the taxiing conditions and of the time remaining before access to the runway. These approaches for taxiing procedures are not completely satisfactory.

SUMMARY OF THE INVENTION

An invention has been made and is disclosed herein which may be embodied as a method for aiding the airport navigation of an aircraft, termed aided aircraft, the method may include:

(i) a first step, implemented by an airport navigation device or person, such as an air traffic controller, which generates a ground route within the airport for the aided aircraft to travel from a first position, e.g., current position, and a second position, such as a terminal gate or a runway. The route includes successive segments for the aircraft to travel.

(ii) a second step, implemented by a position determination device, in which a determination is made of the location of the current ground position of the aided aircraft.

(iii) a display step, implemented by a display device having at least one viewing screen in the cockpit of the aided aircraft, an airport map and at least one symbol illustrating the current position of the aided aircraft and a plot illustrating the route.

(iv) a surveillance step, implemented by a traffic surveillance device, of determining the location of other aircraft nearby the aided aircraft and the type of these other aircraft.

(v) a computation step, implemented by a computation unit, of determining, for each of the segments of the route, at least one corresponding congestion information item, wherein the determination considers the position and type of the other aircraft that are situated on the segment; and (vi) another display step that shows on the viewing screen the congestion information for each segment of the route, in conjunction with the display of the route.

The method generates images displayed on the viewing screens for the pilot(s) of the position of the aided aircraft within the airport and its intended route, and of the location and type of nearby traffic using the congestion. These images provide the pilots information to aid navigation and manage fuel usage. The images may be used by the pilots to implement a taxiing procedure with a single engine running and reliably estimate the taxiing time using the displayed congestion information.

The computation step may include, for each segment of the route:

(i) allocating, to each of the other nearby aircraft situated on the segment, a set length dependent on the type of the nearby aircraft; and (ii) determining as the congestion information item, if relevant, an assembly of one or more occupancy zones of the segment, an occupancy zone being associated with each nearby aircraft situated on the segment and corresponding to the zone covered by the set length allocated to the nearby aircraft.

Furthermore, the computation step may include, for each segment of the route:

(i) summing the lengths of all the nearby aircraft situated on the segment;

(ii) compare this sum with the length of the segment; and (iii) allocate a conjection level to the segment as a function of this comparison.

Moreover, the computation step may include, for each segment of the route:

(i) determine the current speed of each of the nearby aircraft situated on the segment;

(ii) compute a reference speed associated with this segment based on the current speeds of the nearby aircraft situated on the segment;

(iii) compare the reference speed with a theoretical speed; and (iv) allocated to the segment a conjection level as a function of this comparison, wherein the congestion level may serve as a congestion information item.

Furthermore, the computation step may include determining an individual journey time for each segment based on a reference speed associated with the segment and a length of the segment.

The computation step may include in computing at least one of the following times:

(i) a total journey time between the first and second positions along the route;

(ii) a remaining journey time between the current position of the aided aircraft and the second position along the route, (iii) comparing these times based on individual journey time over the assembly of corresponding segments.

The display step may include displaying on a viewing screen in the cockpit at least one time indication relating to at least one of the following times:

(i) the total journey time between the first (initial) and second (last) positions along the route of the aided aircraft; and (ii) the remaining journey time between the current position of the aided aircraft and the second position along the route.

The method of the invention may be embodied to provide the flight crew, e.g., pilots, with indications and predictions on the journey time along a route remaining to reach a destination on the airfield airport by taking account of the chosen route and of the traffic conditions in real time.

Moreover, for each segment, the associated reference speed corresponds:

(i) if no nearby aircraft on the segment, to a predetermined theoretical speed of the aided aircraft;

(ii) if a single nearby aircraft is situated on the segment, to the current speed of the nearby aircraft; and (iii) if a plurality of nearby aircraft are on the segment, to a speed computed on the basis of the current speeds of the nearby aircraft.

The present invention also relates to a system for aiding the ground navigation within an airport of an aircraft, termed aided aircraft, the system comprising:

(i) an airport navigation device able to generate a ground route within the airport of the aided aircraft between a first (initial) position and a second (final) position, the route comprising a plurality of successive segments;

(ii) a position determination device configured to determine the current ground position of the aided aircraft; and (iii) a display device on board the aided aircraft and configured to display, on at least one viewing screen of the aided aircraft, an airport map of the airport and, on this airport map, at least one symbol illustrating the current position of the aided aircraft and a plot illustrating the route.

The system for aiding navigation may comprise:

(i) a traffic surveillance device configured to determine for other aircraft nearby the aided aircraft, which are situated within the airport, at least the current position and the type of each of these nearby aircraft; and (ii) a computation unit configured to determine, for each of the segments of the route, a corresponding congestion information item which indicates the position and type of the other aircraft situated on the segment; and (iii) the display device is configured to show, on each segment of the plot illustrating the route, the corresponding congestion information item.

The computation unit may be configured to determine as congestion information item, if relevant, one or more occupancy zones of the segment, wherein an occupancy zone being associated with each nearby aircraft situated on the segment and corresponding to a zone covered by a set length allocated to this nearby aircraft, which is centred on the current positon of the nearby aircraft, and the set length is dependent on the type of the nearby aircraft.

Furthermore, the computation unit may be configured, for each segment of the route, to:

(i) sum of the lengths of all the nearby aircraft situated on the segment;

(ii) compare the sum with the length of the segment; and (iii) allocate to the segment as a function of the comparison, a congestion level as congestion information item.

Moreover, the computation unit may be configured to determine a an individual journey time over each segment which determination takes into account a reference speed associated with the segment and the length of the segment.

Further, the computation unit may compute at least one of the following times:

(i) a total journey time between the first and second positions along the route;

(ii) a remaining journey time between the current position of the aircraft and the second position along the route, Wherein these times are computed based on of the individual journey times for the segments in the route.

The airport navigation device, the position determination device, the traffic surveillance device and the computation unit may be on board the aided aircraft.

Alternatively, at least the computation unit of the system may be mounted in a device external to the aided aircraft, wherein a data transmission link connecting at least the computation unit to the display device on board the aided aircraft.

The airport navigation device may be in a handheld electronic device, of EFB (for "Electronic Flight Bag") type, which is used on the aided aircraft.

The present invention relates to aircraft, such as commercial passenger and cargo transport aircraft, which are provided with at least one part of such a system for aiding ground navigation.

BRIEF DESCRIPTION OF THE FIGURES

The appended figures illustrate the invention and how it may be embodied. In these figures, identical references designate similar elements. More particularly:

FIGS. 8 and 9 schematically illustrate examples of presentation of navigation data by a display device of the system for aiding navigation.

DETAILED DESCRIPTION

Figure 1:
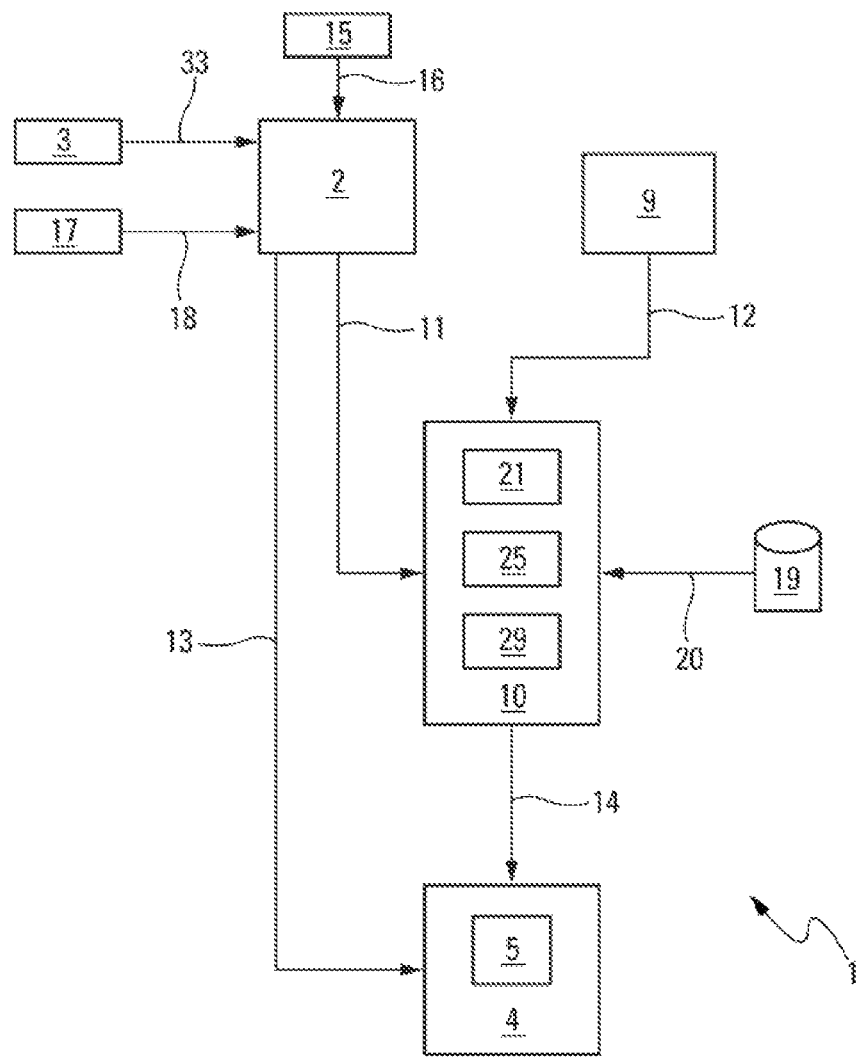
FIG. 1 schematically depicts a system for aiding the ground navigation of an aircraft within an airport.
Figure 2:
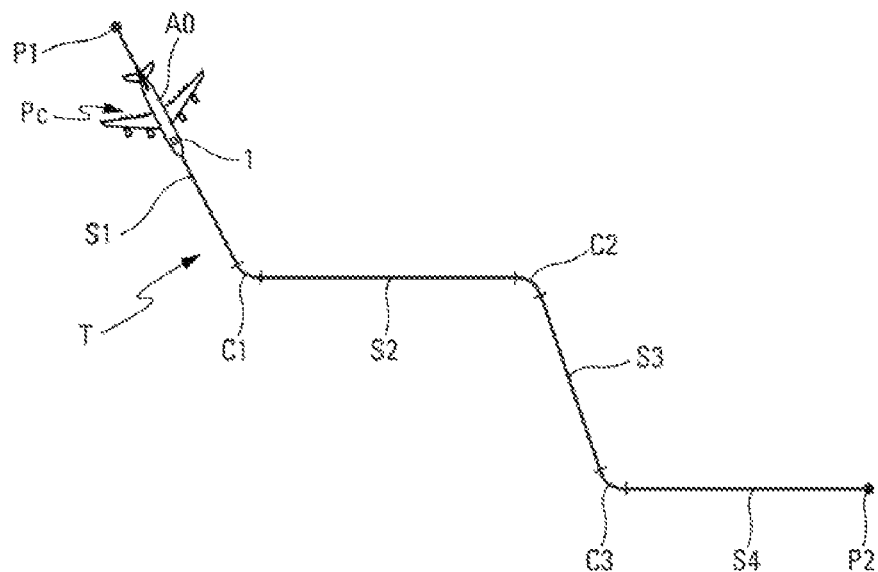
FIG. 2 schematically depicts an exemplary route.

The system 1 represented schematically in FIG. 1 and making it possible to illustrate the invention, is intended to aid with navigation (on the ground) within an airport, an aircraft, termed aided aircraft (A0), in particular a transport aircraft (FIG. 2). In an embodiment of the invention, this system 1 is on board this aided aircraft A0, as represented schematically in FIG. 2.

FIG. 1 shows a system 1 for aiding airport navigation that includes:

an airport navigation device 2 able to generate a route T of the aided aircraft A0 (FIG. 2), between a first position P1 within the airport and a second position P2 within the airport. The route T comprises a plurality of successive rectilinear segments S1, S2, S3 and S4, corresponding in particular to linkways, taxiways or runways of the airport. These rectilinear segments S1, S2, S3 and S4 are generally interlinked via curved sections C1, C2 and C3, circular arcs in particular;

a position determination device 3 configured to determine, in real time, the current position Pc of the aided aircraft A0; and a display device 4 on board the aided aircraft A0 and configured to display, on at least one viewing screen 5 of the aided aircraft A0, as represented in FIGS. 8 and 9, an airport map 6 and, on this airport map 6, at least one symbol 7 illustrating the current position Pc of the aided aircraft A0 and a plot 8 illustrating the route T.

The first position P1 and the second position P2 can correspond to arbitrary positions on ground taxiing segments. It may in particular be a position at the level of a departure gate of the airport, a position on a takeoff runway of the airport, a position on a landing runway of the airport, or a position at the level of an arrival gate of the airport.

The system 1 may further include:

a traffic surveillance device 9 configured to determine for aircrafts other than the aided aircraft, termed nearby aircrafts, which are situated within the airport, at least one current position and a type; and a computation unit 10 which connected by way of links 11 and 12, respectively, to the airport navigation device 2 and to the traffic surveillance device 9 and which is configured to determine, for each of the segments S1 to S4 of the route T, a corresponding congestion information item, doing so as a function at least of the position and of the type (which are received from the traffic surveillance device 9) of the nearby aircrafts situated on the segment.

A nearby aircraft A1, A2 (FIG. 3) may be situated on a segment S2 of the route T, that is to say on a portion of a taxiway or of a runway, when it is located or positioned on this segment S2, while in particular moving (taxiing on the ground) or optionally stopped (for example in case of significant congestion or instruction in this regard from a controller of the airport).

Furthermore, the aircrafts liable to be encountered within the airport are classed by types. A class comprises a number N of possible types of aircraft. By way of illustration, N can be equal to 3, and the types of aircrafts can comprise in this case, respectively, short-haul, medium-haul and long-haul aircraft.

Moreover, the display device 4 which is connected by way of links 13 and 14, respectively, to the airport navigation device 2 and to the computation unit 10, is configured to show, on each segment of the plot 8 illustrating the route T, at least the corresponding congestion information item, as specified hereinbelow with reference to FIGS. 8 and 9.

The congestion information items make it possible to inform the crew in particular so as to improve their anticipation and their decision making.

The airport navigation device 2 comprises an input unit 15 and a route computation integrated element.

In a routine manner, the input unit 15, for example a keypad or a touchscreen, allows an operator, in particular a pilot, to input data (as illustrated by a link 16) which are thereafter used by the route computation element of the airport navigation device 2 to determine the route.

In particular, in a first embodiment, the pilot can enter a departure position (corresponding for example to the current position) and an arrival position (or destination position), and the route computation element determines the route between this departure position (the position P1 in the example of FIG. 2) and this arrival position (the position P2 in the example of FIG. 2).

Furthermore, in a second embodiment, the pilot defines the entire journey that he intends to make the aircraft follow, and the route corresponds to this entered journey.

The aeronautical navigation device 2 provides the computation unit 10, via the link 11, with the planned route of the aided aircraft, in the form of segments S1 to S4 (with their length) and of curved sections C1 to C3 (with the angle and the radius of the circular arc). It also provides the current position of the aided aircraft, with respect to the topology of the runways and of the taxiing zones, and the current speed of the aided aircraft, which are received from the device 3 via a link 16.

The airport navigation device 2 thus provides, in real time, the computation unit 10 with:

the current position and the current speed of the aided aircraft; and the topology of the route with the lengths of segments to be traversed, their geographical positions and the indication of curved sections between the segments.

These information items are also provided by the airport navigation device 2 to the display device 4 via the link 13, as well as the airport map 6 (FIGS. 8 and 9) which is received from a routine navigation database 17 by way of a link 18.

The computation unit 10 may be configured to determine as congestion information item, if relevant (that is to say if this arises), for each segment of the route, an assembly of one or more occupancy zones of the segment. An occupancy zone Z1, Z2 is associated with each nearby aircraft A1, A2 situated on the segment considered as represented for a segment S2 in FIG. 3, and it corresponds to the zone covered by a set length L1, L2 allocated to this nearby aircraft A1, A2. In this case, the set length L1, L2, is centred on the current position Pc1, Pc2 of the nearby aircraft A1, A2. The set length L1, L2 depends on the type of the nearby aircraft A1, A2 considered and it is for example stored in a database.

For the implementation of the envisaged aid, the surveillance device 9 may provide the computation unit 10 with the current position, the current speed and the type of each of the nearby aircrafts.

The surveillance device 9 is, preferably, a traffic surveillance and collision avoidance device of TCAS (for "Traffic Collision Awareness System") type, comprising a function of ATSAW (for "Airborne Traffic Situation AWareness") type which makes it possible to know the nearby traffic with the positions, the speeds and the type of the aircrafts concerned (termed nearby aircrafts). The information items can be generated by cooperative surveillance devices mounted on the nearby aircrafts and using Automatic Dependent Surveillance-Broadcast (ADS-B) technology.

The system 1 comprises, moreover, a database 19 connected by way of a link 20 to the computation unit 10 and containing the theoretical speeds achievable for each type of aircraft and its acceleration, deceleration and speed characteristics, as well as the associated set length.

Figure 4:
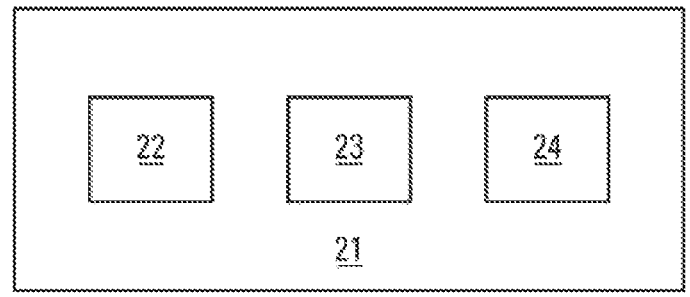
FIGS. 4 to 6 are the schematic diagrams of computation assemblies of a computation unit of the system for aiding navigation.

Furthermore, the computation unit 10 comprises a computation assembly 21 which comprises, as represented in FIG. 4:

a computation element 22 configured to compute, for each segment of the route T, the sum L of the set lengths L1, L2 (FIG. 3) of all the nearby aircrafts A1, A2 situated on the segment S2 considered. L=L1+L2 for the example of the segment S2 of FIG. 3;

a comparison element 23 for comparing the sum L computed by the computation element 22 with the length D (received from the airport navigation device 2) of the segment S2; and an allocation element 24 for allocating to the segment S2, as a function of this comparison, a congestion level as congestion information item.

The type of the nearby aircraft is an information item obtained, in real time, from the surveillance system 9 and is so for each nearby aircraft.

Figure 3:
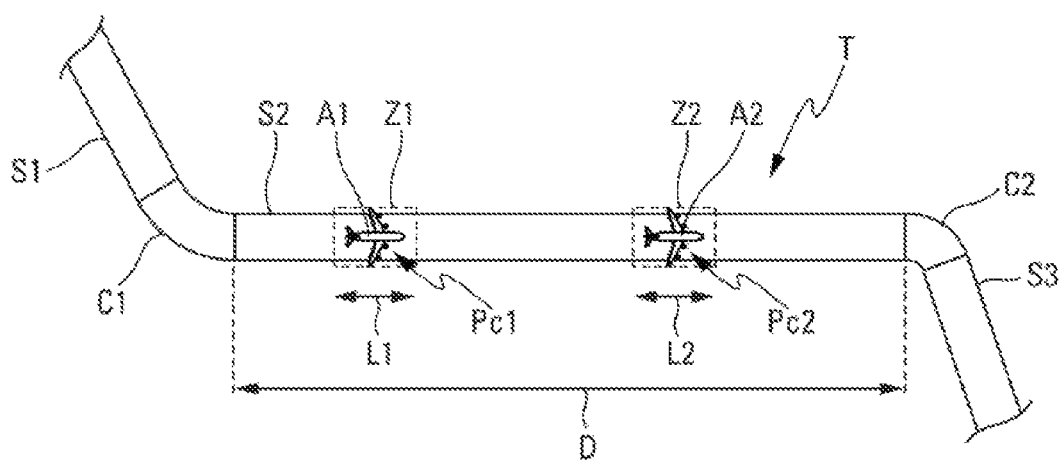
FIG. 3 schematically depicts a part of a route illustrating the presence of other aircraft on a segment of the route.

With each type of nearby aircraft is associated a set length (of occupancy) representing substantially the length that this nearby aircraft occupies on the segment of the route where it is situated, for example the length L1 for the aircraft A1 in FIG. 3.

By way of illustration, the allocation element 24 can, for example, undertake the following allocation, for an arbitrary segment:

(i) if more than 50% of the segment is occupied by nearby aircrafts, then the entire segment is considered to be occupied;

(ii) if at least of 50% of the segment is occupied, then only the set lengths are considered to be occupancy zones (centred on the position of each nearby aircraft), as in the example of FIG. 3.

This congestion information item (congestion level) is made available in a favoured manner to systems of the aided aircraft, in digital form with a binary information item indicating whether the segment considered is fully occupied. If the segment is not occupied, the computation unit 10 dispatches the positions of each of the nearby aircrafts together with the set occupancy length allocated.

This congestion information item (congestion level) can also be made available to systems of the aided aircraft, in graphical form, with an indication of the coordinates of the occupancy zones.

The congestion level determined by the computation unit 21 is presented on the viewing screen 5 by the display device 4, in digital form and/or in graphical form.

Of course, a number of different congestion levels with different respective percentages can be used by the allocation element 24 for the allocation of the congestion level to a given segment.

Figure 5:
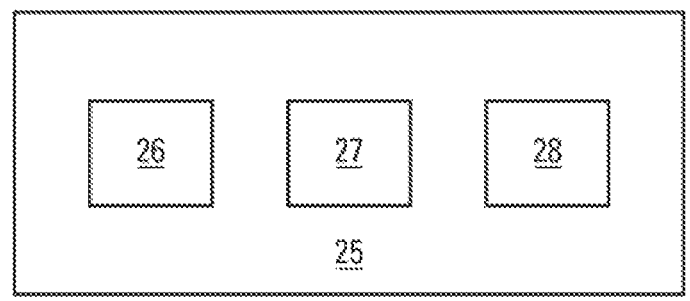

Moreover, the computation unit 10 also comprises a computation assembly 25 which comprises, as represented in FIG. 5:

a computation element 26 for computing, for each segment of the route, a reference speed associated with this segment. This computation is carried out on the basis of the current speeds of the assembly of the nearby aircrafts situated on the segment considered, as specified hereinbelow. These current speeds are received from the traffic surveillance device 9 via the link 12;

a comparison element 27 for comparing, for each segment of the route, the reference speed (computed by the computation element 26) with a theoretical speed (of the aided aircraft on the segment) arising from the database 19; and an allocation element 28 for allocating to the segment, as a function of the comparison carried out by the comparison element 27, a congestion level as congestion information item.

By way of non-limiting illustration, it is possible to provide four congestion levels (absence of congestion, light congestion, congestion, heavy congestion). For example, for a given segment:

(i) if the computed speed is less than 25% of the theoretical speed contained in the database 19, then the segment is considered to be heavily congested, the computed speed being very low with respect to the possible theoretical speed of the aided aircraft because of the congestion;

(ii) if the computed speed lies between 25% and 50% of the theoretical speed, then the segment is considered to be congested;

(iii) if the computed speed lies between 50% and 75% of the theoretical speed then the segment is considered to be lightly congested; and (iv) if the computed speed is greater than 75% of the theoretical speed, contained in the database, then the segment is considered to be uncongested, the computed speed being close to the possible theoretical speed of the aided aircraft.

The congestion information item is updated, in real time, as a function of the positions of the aided aircraft (in motion) and of the positions of the nearby aircrafts.

This congestion information item can be made available in a favoured manner to systems of the aided aircraft:

(i) in digital form, with in the aforementioned example four different values corresponding, respectively, to the four possible congestion levels; and/or (ii) in graphical form, for example with four different colours or with different route segment plots, for example different thicknesses of lines and/or types of lines.

The congestion information item is supplemented with geometric nature considerations provided by the database 19 which allocates a set length to each of the types of aircrafts under surveillance by the surveillance device 9.

Figure 6:
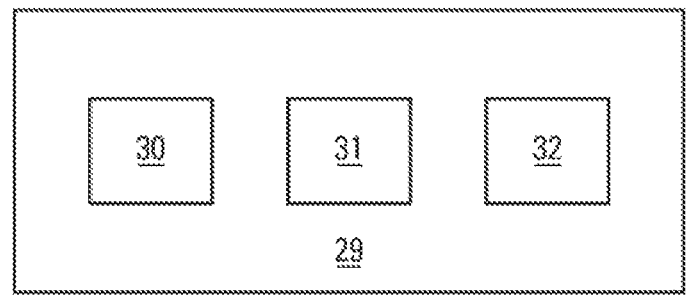

Moreover, the computation unit 10 comprises a computation assembly 29 which comprises, as represented in FIG. 6, a computation element 30 for determining a so-called individual journey time over each segment. Accordingly, the computation element 30 takes into account a reference speed associated with the segment (and computed by a computation element 31, as specified hereinbelow), as well as the length of the segment.

Moreover, the computation assembly 29 also comprises a computation element 32 for computing at least one of the following times:

(i) a total journey time, between the first position P1 and the second position P2 along the route T (FIG. 2);

(ii) a remaining journey time, between the current position Pc of the aircraft A0 and the second position P2 of the aided aircraft taxiing along the route T (FIG. 2).

The computation element 32 computes these journey times on the basis of the individual journey times (computed by the computation element 30) over the assembly of corresponding segments.

The remaining journey time is constantly updated, in real time, on the basis of the current position Pc of the aided aircraft A0 and of the route T remaining to be travelled. The journey time is also recomputed in case of change of route.

The journey times (remaining and total) can be made available to systems of the aided aircraft.

These journey time information items (that the computation unit 10 transmits to the display device 4) are made available to the crew of the aided aircraft by the display device 4.

In a particular embodiment, the display device 4 is configured to display, on the viewing screen 5, at least one time indication relating to at least one of the following times, as represented in FIGS. 8 and 9:

the total journey time TT, between the first position P1 and the second position P2 along the route T (FIG. 3); and the journey time remaining TR, between the current position Pc of the aided aircraft A0 and the second position P2 along the route T.

In the example represented in FIGS. 8 and 9, the times TT and TR are displayed in an appropriate display zone 34 in digital form ("5'" and "10'", that is to say 5 minutes and 10 minutes).

Moreover, the computation element 26 (FIG. 5) and/or the computation element 31 (FIG. 6) determine, for each segment, as associated reference speed:

(i) if no nearby aircraft is situated on this segment, a predetermined theoretical speed of the aided aircraft, stored in the database 19;

(ii) if a single nearby aircraft is situated on the segment, the current speed of the nearby aircraft; and (iii) if a plurality of nearby aircrafts A1 and A2 are situated on the segment, as in the example of FIG. 3 for the segment S2, a speed computed on the basis of the current speeds of the nearby aircrafts A1 and A2. These current speeds are received from the surveillance device 9. This computed speed is, for example, obtained by simply averaging the current speeds considered, or else by doing some other computation, for example by differently weighting the diverse current speeds considered.

Various embodiments and variants of the system 1, such as described hereinabove, are possible.

In a first preferred embodiment, the whole of the system 1 for aiding navigation is on board the aided aircraft A0, that is to say that the airport navigation device 2, the position determination device 3, the traffic surveillance device 9 and the computation unit 10 are, all, on board the aided aircraft A0 in an avionics part of the latter.

In this case, the computation unit 10 may be embedded in an on board computer, which is connected to various data buses of the aided aircraft by links of A429 and/or AFDX type.

Furthermore, in a second embodiment, at least the computation unit 10 is housed in a system external to the aided aircraft, and the system 1 comprises, moreover, a data transmission link (link 14) connecting at least the computation unit 10 to the display device 4 which is on board the aided aircraft A0.

In particular, the computation unit 10 can be housed in a computing system situated on the ground, and the computation of the journey times can be carried out fully on the ground and transmitted to the display device 4 of the aided aircraft A0 by means of terrestrial or satellite communications.

Moreover, in a third embodiment, the airport navigation device 2 forms part of a handheld electronic device, of EFB (for "Electronic Flight Bag") type, which is used on the aided aircraft. In this case, in particular the current position of the aided aircraft can be provided by a real-time on board system or by a position determination system of the EFB device.

Moreover, the computation unit 10 can be housed in a dedicated on board system or can correspond to a software package integrated into an EFB device which receives the position information items of the aided aircraft and the traffic information items of on board systems or of a suitable surveillance device.

The information items provided by the computation unit 10 are either digital and interpretable by the display device 4, or directly provided in graphical form for overlaying on the information items already managed by the display device 4.

In a particular embodiment, the system 1 computes, before the commencement of navigation, for each segment of the route, the journey time as a function of the length of the segment and of the achievable theoretical speed provided by the database 19. The journey times are aggregated to obtain a first theoretical journey time. This information item is made available to systems of the aided aircraft. The theoretical journey time thus obtained is thereafter modified by the actual situation of the traffic on the chosen route.

A method for aiding ground navigation within an airport (or airport navigation) of an aided aircraft is described hereinafter, implemented by the system 1 such as described hereinabove.

This method comprises:

(i) a first step, implemented by the airport navigation device 2, of generating a ground route within the airport for the aided aircraft between a first position and a second position, the route comprising a plurality of successive segments;

(ii) a second step, implemented by the position determination device 3, of determining the current ground position of the aided aircraft;

(iii) a surveillance step, implemented by the traffic surveillance device 9, of determining, for aircrafts other than the aided aircraft, termed nearby aircrafts, which are situated within the airport, at least the current position and the type of each of these nearby aircrafts;

(iv) a computation step, implemented by the computation unit 10, of determining, for each of the segments of the route, at least one corresponding congestion information item, as a function at least of the position and of the type of the nearby aircrafts situated on the segment; and (v) a display step, implemented by the display device 4, of displaying, on the viewing screen 5, an airport map of the airport and, on this airport map, a symbol illustrating the current position of the aided aircraft and a plot illustrating the route, and in showing, on each segment of the plot illustrating the route, the corresponding congestion information item.

An example of navigation aid implemented by the system 1 is specified hereinafter with reference to FIGS. 7, 8 and 9.

Figure 7:
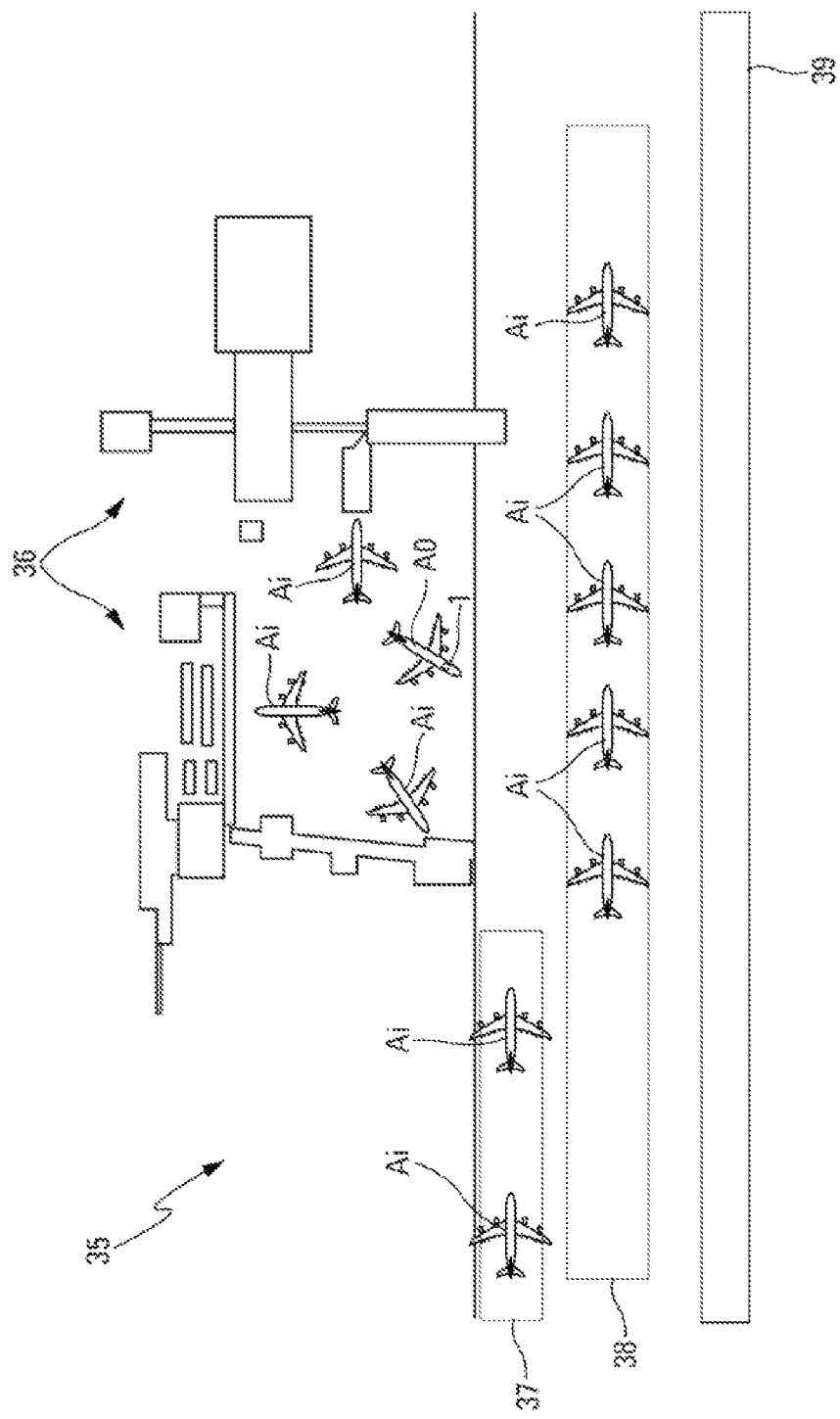
FIG. 7 schematically depicts an airport part on which an aircraft equipped with a system for aiding navigation is situated.

FIG. 7 depicts a part of an airport 35 comprising an infrastructure provided with buildings 36 and ground traffic lanes. By way of illustration, two taxiways 37 and 38 on which are situated nearby aircrafts Ai and a runway 39 (for landing and takeoff) have been represented as ground traffic lanes. The aided aircraft A0 is situated near the passenger boarding infrastructures and is getting ready to proceed to the runway 39 with a view to a takeoff.

The display implemented by the display device 4 on the viewing screen 5 of the aided aircraft has been represented in FIGS. 8 and 9. FIG. 8 corresponds to the situation of FIG.

7 at the start of taxiing, and FIG. 9 corresponds to a posterior situation during taxiing, the aided aircraft (symbol 7) being situated on the taxiway 38 representing a segment SB. The plot 8 comprises three successive rectilinear segments SA, SB, SC.

The congestion level of the segments SA and SC corresponds to an absence of congestion. This congestion level is shown in FIGS. 8 and 9 by a white area, which may correspond to a particular colour on the display actually carried out.

Moreover, the congestion level of the segment SB corresponds to heavy congestion. This congestion level is shown in FIGS. 8 and 9 by a mixed hatched area 40, which may correspond, on the display actually carried out, to a particular colour (for example red).

The display device 4 thus displays, in the example of FIGS. 8 and 9, in addition to the plot 8 illustrating the route T and to the symbol 7 illustrating the current position of the aided aircraft, the prediction of the total journey time TT, the prediction of the time TR remaining to be journeyed, as well as congestion zones (area 40 of the segment SB for example).

The display device 4 may also display information indicating whether a single engine operation is recommended for taxiing the aircraft and whether the taxiing period is sufficient to warmup the engines before a takeoff. The calculated total journey time TT and/or the remaining journey time TR may be compared with a maximum recommended period during which the aircraft is to be operated in a single engine mode during taxiing and to a minimum period during with the aircraft engines are to warmed up before the aircraft takeoffs with the engines running at full power.

While taxiing after a landing and moving to an airport terminal, if the total journey time TT or remaining journey time TR is greater than the maximum recommended period for single engine mode operation, the computational assembly or unit may generate an alert or report indicating that single mode operation should not be used during the entire TT or TR.

If the journey time TT or TR is greater than the maximum recommend period for single mode operation, the computational assembly or unit may also identify the successive segments along the ground route from the final destination at the airport terminal and towards the current position of the aircraft for which the taxiing time best corresponds to, but does not exceed, the maximum recommend period for single engine operation. With those identified successive segments, the computational assembly or unit generates a report or highlights (or otherwise designates) the identified successive segments on the viewing screens. The report or highlighted segments provide information to the pilots indicating during which portion of a taxi route during which the aircraft may be operated in single engine mode.

The computational assembly or unit may also determine whether the journey time TT or TR from the airport terminal to a take-off runway is greater than the minimum period needed to warmup the engines. If the TT or TR is greater than this minimum period, a report or alert may be issued by the computational unit or assembly for display on the viewing screens that the TT or TR is sufficient for warming up the engines. If the minimum period is less than the TT or TR, the computational unit or assembly may generate a report or alert for display on the viewing screen indicating a period during which the engines need to be warmed up prior to taxiing. This period is calculated based on a difference between the minimum warmup period and the TT or TR. Thus, the period during which engines are warmed at the terminal may be reduced by including the TT or TR in the calculation of whether the engines have been warmed for a sufficient period prior to takeoff.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for aiding ground navigation of an aided aircraft within an airport, the system comprising:
   an airport navigation device configured to generate a ground route within the airport for the aided aircraft between a first position and a second position, the ground route divided into successive segments;
   a position determination device configured to determine a current ground position of the aided aircraft;
   a traffic surveillance device configured to identify a current location and type of each of other aircraft on each of the successive segments;
   a computation unit configured to determine, for each of the successive segments, a congestion information item as a function of, at least, the current location and the type of each of the other aircraft on the segment; and
   a display device on board the aided aircraft and configured to display, on at least one viewing screen in the aided aircraft, an airport map of the airport, a symbol of the aided aircraft on a position of the airport map corresponding to the current position of the aided aircraft, a plot on the airport map illustrating the ground route, and an indicator on or near each segment of the congestion information item corresponding to the segment,
   wherein the computation unit is further configured to determine the congestion information item for each segment by:
   designating, for each of the other aircraft on the segment, an occupancy zone on the segment corresponding to the other aircraft and the occupancy zone for each of the other aircraft is presented on the airport map with a length dependent on the type of the other aircraft and centered on the current position of the other aircraft.

2. The system according to claim 1, wherein the airport navigation device, the position determination device, the traffic surveillance device and the computation unit are on the aided aircraft.

3. The system according to claim 1, wherein the computation unit is housed in a device external to the aided aircraft, and in that the system comprises, moreover, a data transmission link connecting at least the computation unit to the display device on board the aided aircraft.

4. The system according to claim 1, wherein the airport navigation device forms part of a handheld electronic device.

5. A system for aiding ground navigation of an aided aircraft within an airport, the system comprising:
- an airport navigation device configured to generate a ground route within the airport for the aided aircraft between a first position and a second position, the ground route divided into successive segments;
- a position determination device configured to determine a current ground position of the aided aircraft;
- a traffic surveillance device configured to identify a current location and type of each of other aircraft on each of the successive segments;
- a computation unit configured to determine, for each of the successive segments, a congestion information item as a function of, at least, the current location and the type of each of the other aircraft on the segment; and
- a display device on board the aided aircraft and configured to display, on at least one viewing screen in the aided aircraft, an airport map of the airport, a symbol of the aided aircraft on a position of the airport map corresponding to the current position of the aided aircraft, a plot on the airport map illustrating the ground route, and an indicator on or near each segment of the congestion information item corresponding to the segment,
- wherein the computation unit is further configured, for each segment of the route, to:
- sum lengths of the occupancy zones;
- compare the sum with a length of the segment; and
- determine the congestion information item based, in part, on the comparison.

6. The system according to claim 5, wherein the airport navigation device, the position determination device, the traffic surveillance device and the computation unit are on the aided aircraft.

7. The system according to claim 5, wherein the computation unit is housed in a device external to the aided aircraft, and in that the system comprises, moreover, a data transmission link connecting at least the computation unit to the display device on board the aided aircraft.

8. The system according to claim 5, wherein the airport navigation device forms part of a handheld electronic device.

9. A system for aiding ground navigation of an aided aircraft within an airport, the system comprising:
- an airport navigation device configured to generate a ground route within the airport for the aided aircraft between a first position and a second position, the ground route divided into successive segments;
- a position determination device configured to determine a current ground position of the aided aircraft;
- a traffic surveillance device configured to identify a current location and type of each of other aircraft on each of the successive segments;
- a computation unit configured to determine, for each of the successive segments, a congestion information item as a function of, at least, the current location and the type of each of the other aircraft on the segment; and
- a display device on board the aided aircraft and configured to display, on at least one viewing screen in the aided aircraft, an airport map of the airport, a symbol of the aided aircraft on a position of the airport map corresponding to the current position of the aided aircraft, a plot on the airport map illustrating the ground route, and an indicator on or near each segment of the congestion information item corresponding to the segment,
- wherein the computation unit is configured to determine a predicted individual journey time for each of the successive segments based on a reference speed for the segment and a length of the segment, and to compute at least one of:
- a total journey time between the first and second positions along the ground route;
- a remaining journey time between the current position of the aided aircraft and the second position,
- wherein the total journey and the remaining journey time are computed based on a sum of the predicted individual journey times for either all of the successive segments or a sum of the segments including the current position of the aided aircraft and the second point.

10. The system according to claim 9, wherein the airport navigation device, the position determination device, the traffic surveillance device and the computation unit are on the aided aircraft.

11. The system according to claim 9, wherein the computation unit is housed in a device external to the aided aircraft, and in that the system comprises, moreover, a data transmission link connecting at least the computation unit to the display device on board the aided aircraft.

12. The system according to claim 9, wherein the airport navigation device forms part of a handheld electronic device.

* * * * *